United States Patent
Ratterman et al.

(10) Patent No.: US 10,806,292 B2
(45) Date of Patent: Oct. 20, 2020

(54) BEVERAGE DISPENSING SYSTEM

(71) Applicant: BUNN-O-MATIC CORPORATION, Springfield, IL (US)

(72) Inventors: Jamie D. Ratterman, Springfield, IL (US); Jason M. Banning, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 14/416,001

(22) PCT Filed: Jul. 22, 2013

(86) PCT No.: PCT/US2013/051514
§ 371 (c)(1),
(2) Date: Jan. 20, 2015

(87) PCT Pub. No.: WO2014/015340
PCT Pub. Date: Jan. 23, 2014

(65) Prior Publication Data
US 2015/0150410 A1  Jun. 4, 2015

Related U.S. Application Data

(60) Provisional application No. 61/674,204, filed on Jul. 20, 2012.

(51) Int. Cl.
*A47J 31/40* (2006.01)
*A47J 31/52* (2006.01)

(52) U.S. Cl.
CPC ........... *A47J 31/402* (2013.01); *A47J 31/404* (2013.01); *A47J 31/525* (2018.08)

(58) Field of Classification Search
CPC ........ A47J 31/402; A47J 31/46; A47J 31/465; A47J 31/467
(Continued)

(56) References Cited

U.S. PATENT DOCUMENTS

| 4,919,041 A * | 4/1990 | Miller ..................... A47J 31/40 99/279 |
| 5,372,061 A * | 12/1994 | Albert ..................... A47J 31/56 99/281 |

(Continued)

FOREIGN PATENT DOCUMENTS

WO  WO 2010/077697  7/2010

OTHER PUBLICATIONS

Search Report & Written Opinion in Int'l App. No. PCT/US2013/051514 (dated 2014).

*Primary Examiner* — Helen F Heggestad
(74) *Attorney, Agent, or Firm* — Barnes & Thornburg LLP

(57) ABSTRACT

A beverage system for producing and dispensing a beverage for controlled serving dispensing which includes a maker module for dispensing a beverage ingredient such as tea to a dispensing module which then communicates with a mixing module for controlled serving dispensing. Another embodiment of the beverage apparatus includes a dispense module which receives beverage from a making module and in which the dispensing module is transferable to a mixing module for subsequent controlled serving dispensing. Further, additional features such as sweetener integration, controlled mixing, controlled dispensing, and product characteristic sensing may be provided.

14 Claims, 2 Drawing Sheets

(58) Field of Classification Search
USPC .......................................... 426/590, 597, 59
See application file for complete search history.

(56) References Cited

U.S. PATENT DOCUMENTS

| | | | |
|---|---|---|---|
| 7,268,698 B2 | 9/2007 | Hart et al. | |
| 2001/0048958 A1* | 12/2001 | Funk | A47J 31/402 |
| | | | 426/231 |
| 2005/0061156 A1 | 3/2005 | Hart et al. | |
| 2006/0267403 A1* | 11/2006 | Newton | |
| 2010/0212336 A1* | 8/2010 | Chapman | F25C 5/002 |
| | | | 62/99 |
| 2011/0008504 A1* | 1/2011 | Wells | A47J 31/41 |
| | | | 426/435 |

\* cited by examiner

BEVERAGE DISPENSING SYSTEM

CROSS REFERENCE TO RELATED APPLICATIONS

This application is a U.S. nationalization under 35 U.S.C. § 371 of International Application No. PCT/US2013/051514, filed Jul. 22, 2013, which claims the benefit of priority under 35 U.S.C. § 119(e) to U.S. Provisional Patent Application No. 61/674,204, filed Jul. 20, 2012. The disclosures set forth in the referenced applications are incorporated herein by reference in their entireties.

BACKGROUND

A variety of beverage producing systems have been developed which combine a beverage making substance with water to produce a resultant beverage. Some of the systems use a fresh beverage making substance such as tea, coffee, herbal preparations, botanicals or other products to produce the resultant beverage. For example, tea leaves and other materials may be prepared for use in making a tea beverage. One way to produce a tea beverage is by mixing heated water with the tea substance to extract desirable beverage characteristics from the tea substance.

One way in which tea substances are used is in the preparation of iced tea. Iced tea can be prepared in a sweetened or unsweetened form. Many people find iced tea to be a refreshing drink and it is a popular beverage.

Iced tea can be prepared in one of many ways. One way is to produce a brewed tea and simply mix it with ice. The brewed tea can be added to the ice in hot form or cooled to ambient or chilled for subsequent mixing with ice. Cooling a brewed tea to ambient or chilling it has the benefit of reducing the dilution of the tea or extending the time during which it becomes diluted when mixing it with ice.

It would be desirable to develop improved systems, apparatus, and methods for producing iced tea beverages.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

Figure 1:
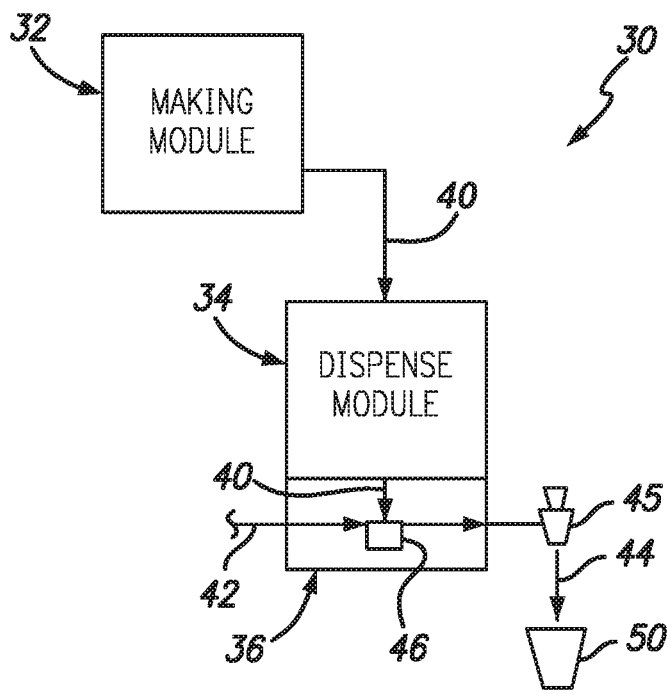
FIG. 1 is a diagrammatic illustration of a version of a beverage system for producing and dispensing a beverage for controlled serving dispensing, in this embodiment a maker module dispenses tea to a dispensing module which then communicates with a mixing module for controlled serving dispensing.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

With reference to FIG. 1, a beverage apparatus 30 is shown which includes a beverage making module 32 and a dispensing module 34. Freshly prepared beverage 36 is transferred from the making module 32 to the dispense module 34. As will be described in further detail with regard to FIG. 2 the dispense module 34 communicates with a mixing module 36.

The making module 32 may be in the form of a brewer, reconstituter, or other device which combines a beverage brewing substance, or first ingredient, with a second ingredient such as a liquid substance for producing a beverage 36. As an example, the brewer may be in the form of a brewer which combines heated, ambient or chilled water with a beverage substance such as tea, coffee, herbals, botanicals, liquid, granular, powder, or other forms of beverage ingredients, such as concentrate forms of beverage ingredients for producing the beverage 36. The use of the term brewer or maker should be broadly interpreted and is considered to be a term used for purposes of illustration and not limitation. The broadest possible interpretation of this making module 32 should be applied to the present disclosure including all currently known embodiments as well as those to be developed which could be substituted for this making module in any form. For the purposes of the present disclosure, reference will be made to a tea brewer which combines fresh tea ingredients with heated water for dispensing a freshly brewed tea beverage ingredient 36. Additionally, the beverage 36 could be in the form of ready to serve, concentrated, or other variations thereof having other characteristics. For purposes of the present disclosure, reference is made to a concentrated tea beverage 36 which is to be dispensed into a dispense module 34.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating, or passing a liquid around, through, or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods. Furthermore, use of a dilution ingredient is to be broadly interpreted. While "water" is referred to for convenience throughout the application it should be understood that any variety of dilution ingredients could be used with the present application.

In the embodiment as shown in FIG. 1, the brewer 32 combines the tea ingredients with heated water generally in a known manner to produce a concentrated tea beverage 40 which is dispensed into the dispense module 34. As noted above, the dispense module 34 communicates with a mixing module 36. This communication may be in terms of a direct attachment or merely by delivering beverage concentrate 40 from the dispense module 34 to the mixing module 36. Regardless of the way in which the concentrate 40 is delivered to the mixing module 36, water 42 is combined with the concentrate 40 to produce a predetermined beverage 44 in a controlled manner A mixing control 46 is provided between the concentrate 40 and the water 42. The combination of these ingredients as mixing control 46 allow for an adjustable and controllable combination to achieve predetermined beverage characteristics upon dispensing the finished beverage 44 to a serving container 50.

The mixing control 46 may be in the form of a controllable valve, Venturi device, more complex mixing assembly, CF valves, as well as other apparatus. Variations on this type of mixing control 46 will be described in greater detail in reference to FIG. 3.

Figure 2:
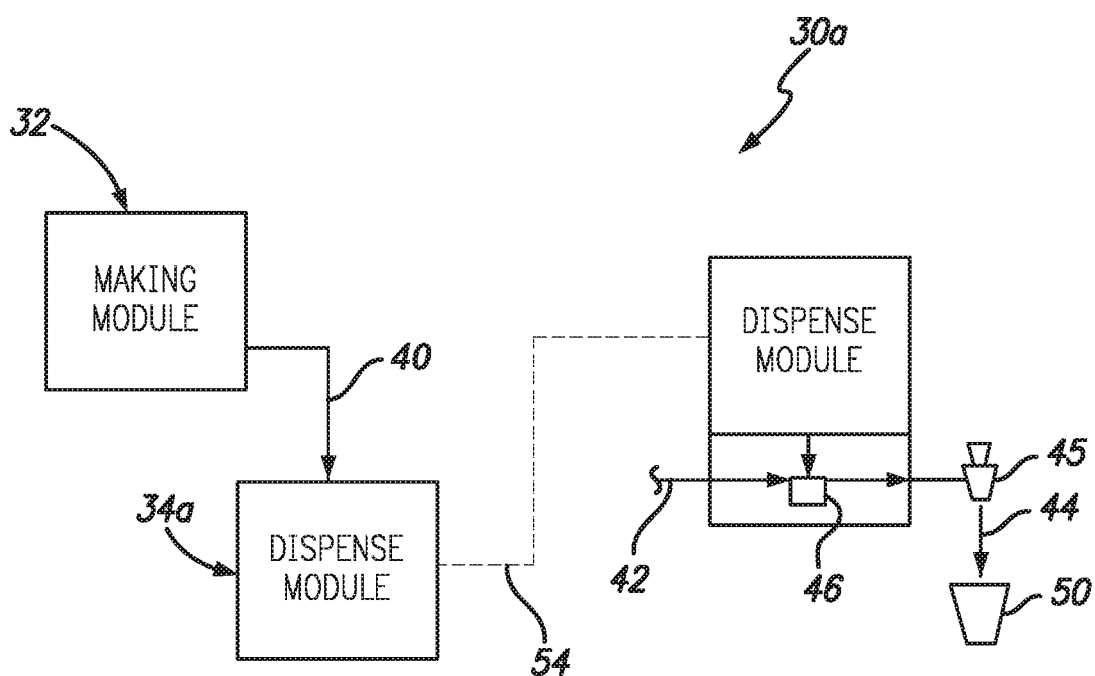
FIG. 2 is another embodiment of the beverage apparatus similar to that as shown in FIG. 1 in which the dispense module receives beverage from a making module and is transferable to a mixing module for subsequent controlled serving dispensing.

Moving to FIG. 2, an alternative embodiment of the beverage apparatus 30 is shown in which the dispense module 34a is a movable or transferable to a mixing module 36 which is remote from or otherwise spaced from the making module 32. The mixing module 36 may be the same as described herein above with regard to FIG. 1 and as will be described with regard to FIG. 3. As shown, the dispense module 34 may be in the form of a container, rigid, flexible, or otherwise which can be transferable to the mixing module 36. As an example, the dispense module 34a may be in the form a container which can then be poured into a corresponding dispense module coupled to the mixing module 36. Alternatively, the dispense module 34a might receive the beverage 36 from the brewer 32 for transfer to a device such as a liner which is placed within a dispense module. The objective of a liner would be to allow for quick and easy clean up upon exhausting beverage from the dispense module coupled to the mixing module 36 or at the end of a usable life of the liner as dictated by the materials of the liner or the standards (sanitation, life, shift, etc.) of the party serving and/or selling the beverage.

Regardless of the embodiments of FIG. 2, the dispense module 34a, or at least the beverage 36 retained therein is transferable 54 to a dispense module (either the same 34a or a separate module) communicating with a mixing module 36. In this regard, a single brewer 32 can be used to produce beverage for dispensing into dispensing modules 34a which can then be distributed to other mixing module 36 locations or removed to a cooling area for cooling the ambient or for chilling. For example, a freshly brewed tea concentrate 36 dispensed into its dispense module 34a which is movable from the brewer 32 can be moved to an area to settle, cure, or otherwise rest subsequent to dispensing. The resting may involve maturation of beverage characteristics, holding for later dispensing, or perhaps cooling of the beverage for subsequent dispensing. This would also allow the beverage maker to develop a buffer volume of beverage dispense modules 34a including one or more modules for distribution to one or more corresponding mix modules 36. This development of a buffer volume would allow the beverage maker to accumulate beverage during an opportune period of time for subsequent dispensing during peak dispensing periods. As an example, it may be desirable to freshly produce concentrated tea beverage during slower business hours such as in the evenings for accumulation and storage for dispensing at a later time during the subsequent day or later depending on the freshness life of the beverage ingredient. In this regard, a buffer volume of beverage concentrate can be used for dispensing on demand during peak hours. For example, if the demand for iced tea rises throughout the day, the beverage makers will not need to make extra tea but can merely pull from their reservoir or buffer volume of dispenses modules 34a.

Also, it may be desirable to produce the beverage 36 in a concentrated condition. In this regard, the recipe or formula for producing beverage 36 can be used to produce a concentrated beverage. The concentrated beverage can be used to create a volume advantage such that one volume of beverage concentrate can be produced and mixed with multiple volumes of water to reconstitute a fresh beverage. This allows the beverage maker to produce a relatively large volume of beverage on demand while only maintaining a smaller volume of beverage concentrate. This allows the beverage maker to leverage ingredients, time, space, and employee effort. As an example, if a beverage concentrate is used to create beverages in a 1:5 ratio this allows one gallon of beverage concentrate to be deployed or otherwise used with a mixing module to create 5 gallons of beverage. This is beneficial such that a smaller volume of beverage concentrate only needs to be stored, it tends to cool faster than five times the volume, can be better controlled in terms with reconstituting with ice to provide cooling, is easier for employees to transport, requires smaller volume containers for storage, and requires subsequently less time for cleaning, as well as other benefits.

With regard to the cooling issue, a relatively small volume of concentrate can be mixed with water on demand to achieve a reconstituted beverage at a controllably desirable temperature. If the beverage concentrate is chilled to a desired temperature or provided at ambient, water can be introduced at a desired temperature to produce a resulting temperature which is more controllable. Additional, ambient temperature concentrate can be dispensed over ice of a known volume to produce a resulting beverage having a resultant temperature within a targeted range. Further, concentrated beverage can be mixed with water or liquid flavoring and/or sweetening ingredients to more controllably dispense beverages within a targeted range of characteristics.

Figure 3:
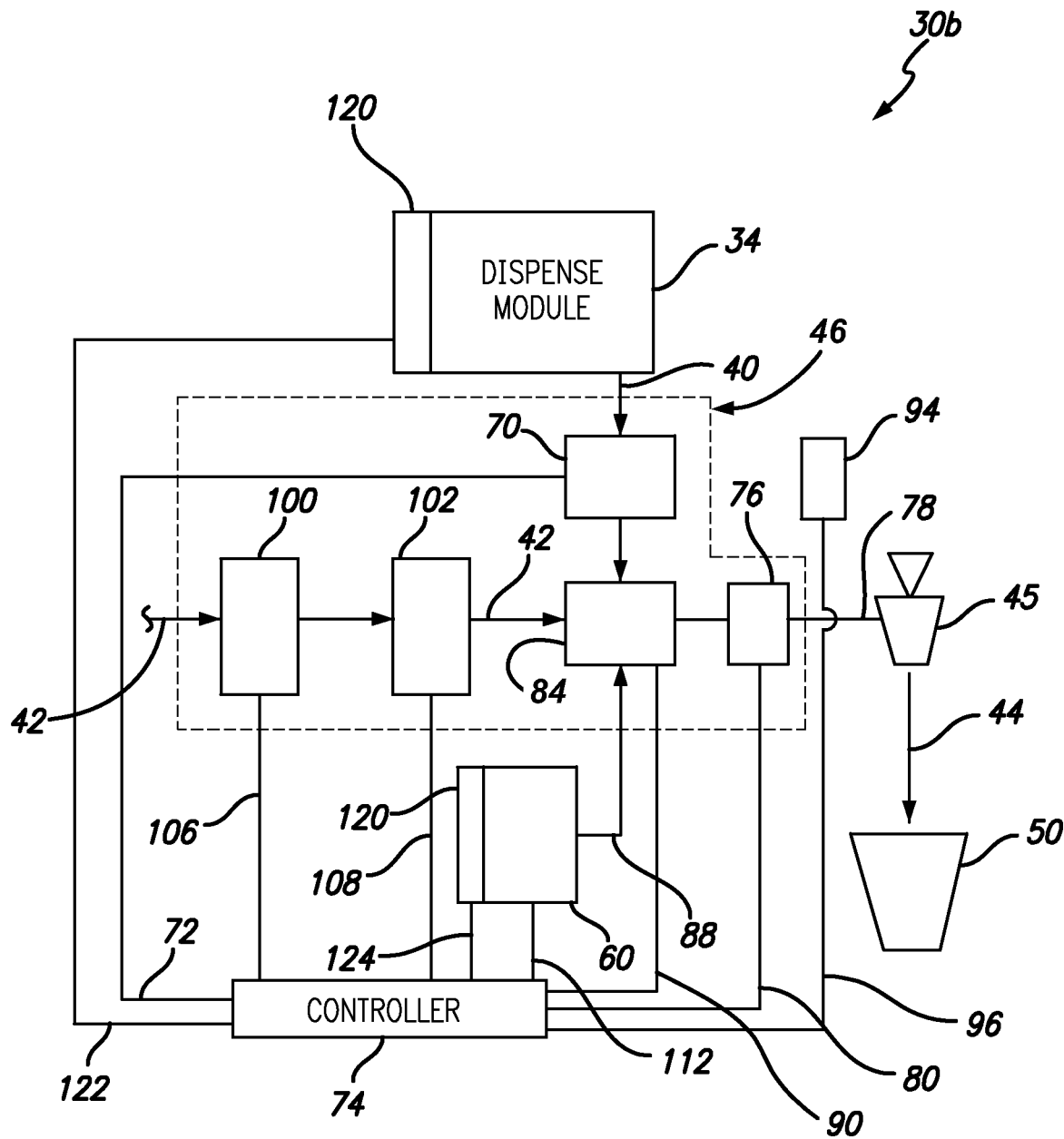
FIG. 3 is an embodiment of the dispense module which can be associated with the brewer in the form of either embodiment shown in FIGS. 1 and/or FIG. 2 or other variations thereof, including additional features such as sweetener integration, controlled mixing, controlled dispensing, and product characteristic sensing.

With regard to FIG. 3, an embodiment of a beverage apparatus 30b in which the dispense module 34 of any of the variations already described or to be described is coupled with a mixing control 46. Also provided with this embodiment is a sweetening module 60 which can provide sweetening and flavoring either together or separately for controlled dispensing of a sweetened, sweetened and flavored, unsweetened and flavored, or unsweetened and unflavored tea beverage 44. As shown in FIG. 3, the dispense module 34 provides concentrate 40 to the mixing module 46. A pump 70 receives beverage 40 from the dispense module 44. The pump can then controllably operate via line 72 coupled to a controller 74. The controller can controllably increase or decrease the dispense rate of beverage 40 dispensed from the module 34. A beverage characteristic sensor 76 may be included and coupled to the outlet line 78 to detect the characteristics of the finished beverage being dispensed. The characteristic sensor 76, when included in the system, is coupled to the controller 74 via line 80. However, the system does not require the characteristic sensor 76 in all embodiments and may be configured without the characteristic sensor 76. Controls may be provided to adjust settings used to dispense the ingredients by means of valves and flow controls. In one embodiment a Venturi device 84 can be coupled to the system to controllably introduce concentrate 40 and water 42 as well as sweetener 88. While a control line 90 is coupled to the Venturi device 84 as shown, the Venturi device might not be controllable and may merely be a mechanical version of a Venturi.

Further, a control panel 94 may be coupled via line 96 to the controller 74 to allow a user who is dispensing beverage to dial in a desired beverage characteristic. In this regard the user can select unflavored beverages, flavored beverages, unsweetened beverages, sweetened beverages, as well as sweetened and flavored beverages. Control panel 94 will also allow the user to select a volume, other beverage characteristics such as strength, temperature, as well as any other characteristics that may be relevant to the currently available beverage ingredients as well as characteristics which are discovered subsequent to this application.

Also shown in FIG. 3 is additional detail with regard to the mixing module 46. In this regard, an embodiment of the beverage apparatus 30b may include a mixing module 46 which includes a solenoid inlet valve 100 coupled to the water line 42 which communicates with a CF valve 102 which communicates with the Venturi 84. The solenoid valve 100 is coupled to the controller 74 via line 106. The CF valve 102 is a mechanical valve. As such a control line is not required. However, it may be that a control line is put rather to an alternate form of CF valve control line 108 provided to an alternate form of CF valve 102 which includes either sensors or controllable features.

As an additional feature, the sweetener integrating module 60 may be coupled to the controller via line 112. The sweetener integrating module may provide a sweetening ingredient such as might be presented in a bag-in-box ("BIB") form or an automatic refill system such as offered by Bunn-O-Matic Corporation of Springfield, Ill. to replenish beverage ingredients into a frozen or chiller beverage dispensing unit. The automatic refill device allows for the combination of powdered or other forms of ingredients with water to reconstitute the ingredients. In this regard, fresh liquid sweetener could be produced onsite for dispensing directly into the beverage system. In this regard, cane sugar or other crystalline forms of sugar could be reconstituted into a liquid in combination with water or other ingredients to produce a desirable flavor and/or sweetening characteristic. Some beverage sellers prefer certain flavor characteristics associated with different types of sweeteners. As such, this sweetener integrating module 60 will provide a broad range of flexibility to accommodate any one or combination of a number of sweetening ingredients. For example, sweeteners such as crystal and cane sugar, viscous honey, agave, high fructose corn syrup or other sweeteners can be provided in any one of a number of stable forms for use in sweetening the resultant beverage 44. These sweeteners can be maintained in a shelf stable manner and then subsequently reconstituted to a base concentration which can be controllably dispensed. The reference to sweeteners is intended to be considered by way of illustration and not limitation to incorporate all known and hereafter known sweetening ingredients and characteristics.

In use, the beverage apparatus is shown and described in several variations throughout the present application. The system includes the making module 32, dispense module 34, mixing module 36 and a variety of additional components. Broadly, the making module 32 produces at least a concentrate form 36 of beverage which is dispensed into the dispense module 34. Once dispensed into the dispense module, the module can be used to hold the concentrate 36 for subsequent dispensing. The module can be either a dedicated module which is attached to a mixing module 36 or may be transferable 54 to a serving location such as front of house, drive thru, kitchen, serving, or other location. The dispense module can either be a container for dispensing into a secondary module or may be a transferable "plug-in" type of container. The plug-in type of container will couple to the mixing module 36. In this regard, associated mating features and coupling assemblies will be provided at the interface between the dispense module 34 and the mixing module 36. Alternatively and/or additionally, a removable liner could be provided with the dispense module, also providing the relevant coupling devices, for connection with the mixing module 36. A liner might be a flexible plastic liner or similar device which will allow the liner to be removed and disposed or recycled to help minimize cooling complexity and requirements.

The beverage apparatus 30 can include a single making module 32, or multiple making modules 32 in association with single or multiple dispense modules 34. The system is scalable to accommodate one or more modules to satisfy the needs of the beverage seller.

In the method of dispensing, the concentrate 40 can be dispensed from the module 34 in a controlled manner. Similarly, sweetener 88 can be dispensed from a sweetening module 60 for integration into the final beverage 44. The sweetener may be any form of sweetener either in solid, liquid, gel, vaporous, other form currently known or hereafter created. The sweetener may be artificial, natural, and any other form of sweetener or combinations thereof which may include flavoring other than sweetness without limitation. Additionally, the sweetening module 60 may be used to integrate various additional flavors for combination with a uniform sweetener having no additional flavor characteristics other than the sweetening characteristics. The sweetener integration module 60 is couple to the controller 74 for controlled dispensing sweetener.

A variety of technology options are available and/or may be employed for integrating a digital display, such as display 94, to allow for the operator to control various characteristics of the apparatus. For example, the operator may be able to control the temperature of the various ingredients, recipe of the various preset settings, as well as ways to load additional recipes through RFID, magnetic codes, bar codes, QR codes, or any other technology device which will allow for transfer of recipes and other information. Additionally, product characteristic sensing technology 120 can be associated with the dispense module as well as the sweetener module. These characteristics sensing devices are coupled via lines 122, 124 to the controller 74, respectively. The product characteristic sensing devices 120 include one or more of the following: level sensing, temperature sensing, TDS sensing, freshness sensing, preventative maintenance sensing and lockout, as well as any other characteristic which might be sensed by any means and which might be relevant to the operator of the apparatus.

The beverage 36 in the dispense module 34 may be provided in the form of a concentrate. The ratio of concentrate to finished product 44 is controlled by the operator and other features such as the beverage making material. The use of a concentrate will help to make the operation of the beverage dispensing system more efficient.

The dispense module 34 can also be provided with or attached to a refrigeration device to help chill the beverage 36 retained therein. The refrigeration device may be in the form of thermal electrics, coil and ice-bank technology or other devices. These devices could be coupled to the controller 74 to maintain the concentrate 36 at a predetermined temperature. Also, thermal installation could be provided with or without the refrigeration technology so as to maintain the beverage 36 in the module 34 within a temperature range for a longer period of time without control.

Additionally, a variety of beverage making substances may be used with the making module 32. In this regard, fresh loose ingredients such as loose tea or freshly ground coffee may be used. Additionally, prepackaged and premeasured beverage making components can be used. In this regard, a pouch pack, pod, cartridge, or other premeasured prepackaged container of ingredients can be used. This is useful to help maintain standardization of the beverage 36 prepared by the making device 32. Also, this may help in the maintenance of the freshness of the ingredients by maintaining the ingredients in a sealed condition as opposed to an open and exposed condition.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A system for use in preparing and dispensing a beverage, the system a comprising:
   a beverage concentrate making module;
   a beverage concentrate dispensing module communicating with and receiving beverage concentrate from the beverage concentrate making module for retaining beverage concentrate for controlled dispensing and subsequent dilution on demand and providing a separate ingredient source for beverage concentrate used in the system;
   a dilution module including
   a water source communicating with and controllably dispensing water to the dilution module for dilution of the beverage concentrate on demand and providing a separate ingredient source for water used in the system;
   a Venturi communicating with and receiving beverage concentrate from the beverage concentrate dispensing module;
   a controller for controllably operating dispensing of separate ingredients to the Venturi for combining at the Venturi for delivery to a container;
   a control valve communicating with the water source and the Venturi and coupled to the controller for controllably dispensing beverage concentrate from the dispensing module to the Venturi separate from the other ingredients;
   a constant flow valve coupled to the control valve to provide a predetermined pressure on an outlet side of the constant flow valve;
   a sweetener module controllably communicating with the Venturi for controllably dispensing at least a sweetener separate from other ingredients and providing a separate ingredient source for sweetener used in the system; and
   a pump communicating with the beverage dispensing module and the Venturi and coupled to the controller for controllably dispensing beverage concentrate from the dispensing module to the Venturi separate from the other ingredients; and
   one or more of the modules being operatively controlled by the controller for producing a desired beverage and dispensing the beverage through a nozzle coupled to the Venturi and into a container.

2. A beverage apparatus for use in preparing and dispensing a beverage comprising:
   a beverage concentrate making module;
   a beverage concentrate dispense module communicating with and receiving beverage concentrate from the beverage making module for retaining beverage concentrate for controlled dispensing and subsequent dilution on demand and providing a separate ingredient source for beverage concentrate used in the apparatus;
   a mixing module communicating with and receiving beverage concentrate from the beverage concentrate dispensing module;
   a water source communicating with and controllably dispensing water to the mixing module for dilution of the beverage concentrate on demand and providing a separate ingredient source for water used in the system;
   a Venturi associated with the mixing module for receiving beverage concentrate from the dispense module for controllable combination with a second ingredient for dispensing from the mixing module;
   a control valve communicating with the water source and the Venturi and coupled to the controller for controllably dispensing beverage concentrate from the dispensing module to the Venturi separate from the other ingredients;

a constant flow valve coupled to the control valve to provide a predetermined pressure on an outlet side of the constant flow valve;

a pump communicating with the beverage dispensing module and the Venturi and coupled to the controller for controllably dispensing beverage concentrate from the dispensing module to the Venturi separate from the other ingredients; and one or more of the modules being operatively controlled by the controller for producing a desired beverage and dispensing the beverage through a nozzle coupled to the Venturi and into a container.

3. The beverage apparatus as set forth in claim 2 further comprising a sweetner module controllably communicating with the Venturi for combining sweetener with the beverage concentrate and second ingredient, and the controller coupled to the sweetener module and the mixing module for controllably dispensing concentrate from the dispense module and sweetener from the sweetener module.

4. The beverage apparatus as set forth in claim 2 further comprising:

a characteristic sensing device associated with the beverage concentrate dispense module and coupled to and communicating with the Venturi for detecting at least one of level sensing, temperature sensing, total dissolved solids sensing, freshness sensing, preventative maintenance sensing.

5. The beverage apparatus as set forth in claim 2 further comprising:

a characteristic sensing device associated with the Venturi and coupled to and communicating with the Venturi for detecting characteristics of the beverage being dispensed.

6. The beverage apparatus as set forth in claim 2 further comprising:

a characteristic sensing device associated with the sweetener module and coupled to and communicating with the Venturi for detecting characteristics of the sweetener being dispensed.

7. The beverage apparatus as set forth in claim 2 further comprising:

a control panel coupled to and communicating with the Venturi, wherein the control panel is used to selectively control the characteristics of the beverage dispensed.

8. A method of making and dispensing a beverage from a beverage apparatus, the method comprising the steps of:

producing a beverage concentrate;

dispensing the beverage concentrate into a dispensing module;

retaining the concentrate in the dispensing module for controlled dispensing and subsequent dilution on demand;

providing a mixing control including a Venturi for controllably combining ingredients from separate ingredient sources for controllable dispensing through a nozzle coupled to the Venturi;

controllably dispensing water from a separate water source to the Venturi using a control valve coupled to and communicating with a controller;

providing a constant flow valve coupled to the control valve to provide a predetermined pressure on an outlet side of the constant flow valve;

controllably dispensing the beverage concentrate from the dispensing module separate from other ingredients and coupled to the Venturi using a pump coupled to and communicating with the controller;

controllably dispensing least a sweetener separate from other ingredients and coupled to and communicating with the Venturi;

combining the separate ingredients delivered to the Venturi in the Venturi; and controllably dispensing the combined ingredients from the mixing control in the form of a sweetened beverage to a container.

9. The method of making and dispensing a beverage from a beverage apparatus as set forth in claim 8 further comprising the steps of:

controllably dispensing no sweetener or some volume of sweetener under the control of the controller.

10. A method of making and dispensing a beverage from a beverage apparatus as set forth in claim 8 further comprising the steps of:

providing a characteristic sensing device associated with dispense module and coupled to and communicating with the controller for detecting at least one of level sensing, temperature sensing, total dissolved solids sensing, freshness sensing, preventative maintenance sensing.

11. A method of making and dispensing a beverage from a beverage apparatus as set forth in claim 10 further comprising the steps of:

locking out control of the operation of the beverage apparatus in response to one of the characteristics sensed.

12. A method of making and dispensing a beverage from a beverage apparatus as set forth in claim 8 further comprising the steps of:

providing a characteristic sensing device associated with the Venturi and coupled to and communicating with the controller for detecting characteristics of the beverage being dispensed.

13. A method of making and dispensing a beverage from a beverage apparatus as set forth in claim 8 further comprising the steps of:

providing a characteristic sensing device associated with the sweetener module and coupled to and communicating with the controller for detecting characteristics of the sweetener being dispensed.

14. A method of making and dispensing a beverage from a beverage apparatus as set forth in claim 8 further comprising the steps of:

providing a control panel coupled to and communicating with the controller; and controllably operating the beverage apparatus to selectively control the characteristics of the beverage dispensed.

* * * * *